United States Patent [19]

McDonner

[11] Patent Number: 5,146,735
[45] Date of Patent: Sep. 15, 1992

[54] LAWN MOWER DRIVE AND CONTROL SYSTEMS

[75] Inventor: Orville R. McDonner, Conyers, Ga.

[73] Assignee: Fuqua Industries, Inc., McDonough, Ga.

[21] Appl. No.: 545,563

[22] Filed: Jun. 29, 1990

[51] Int. Cl.$^5$ .................... A01D 69/08; A01D 69/10
[52] U.S. Cl. .................... 56/11.3; 56/11.6; 56/11.7; 56/DIG. 6; 180/19.3; 192/11
[58] Field of Search .............. 56/11.3, 11.2, 11.4, 56/11.5, 11.6, 11.7, 16.9, DIG. 6; 180/19.3, 19.1; 192/11, 12 R, 17 R

[56] References Cited

U.S. PATENT DOCUMENTS

| | | | |
|---|---|---|---|
| 4,558,558 | 12/1985 | Horner, Jr. et al. | 192/11 |
| 4,704,847 | 11/1987 | Greider et al. | 56/11.3 |
| 4,879,867 | 11/1989 | Wenzel | 56/11.3 |
| 4,885,903 | 12/1989 | Scag | 56/10.8 |
| 4,920,733 | 5/1990 | Berrios | 56/10.9 |
| 4,920,734 | 5/1990 | Wenzel | 56/11.3 |
| 4,967,543 | 11/1990 | Scag et al. | 56/10.8 |

Primary Examiner—Terry Lee Melius
Attorney, Agent, or Firm—Jones, Askew & Lunsford

[57] ABSTRACT

A walk-behind power driven lawn mower having a transverse handlebar rearwardly of the mower, a pair of hand operated control levers located forwardly of and adjacent to the handlebar and extending generally parallel thereto for establishing the drive and applying the brakes to a pair of driven wheels of the lawn mower. A park brake lever is mounted between said control levers for simultaneously applying the brakes to the driven wheels through a connection between the park brake lever and the control levers. A releasable latch mechanism releasably holds the park brake lever in the braking position. Another control lever in the form of a bail is mounted to be pivoted rearwardly relative to the handlebar for engaging idler pulleys when the transmission is shifted to provide reverse movement. Each drive to the wheels includes a drive pulley and belt and another idler pulley for engaging the belt to establish drive when the transmission is shifted for forward movement. During shifting of the transmission, the drive from the engine to the transmission is automatically disengaged. A dead man control lever is also mounted to be movable against the handlebar on a side opposite where the hand levers are located.

36 Claims, 9 Drawing Sheets

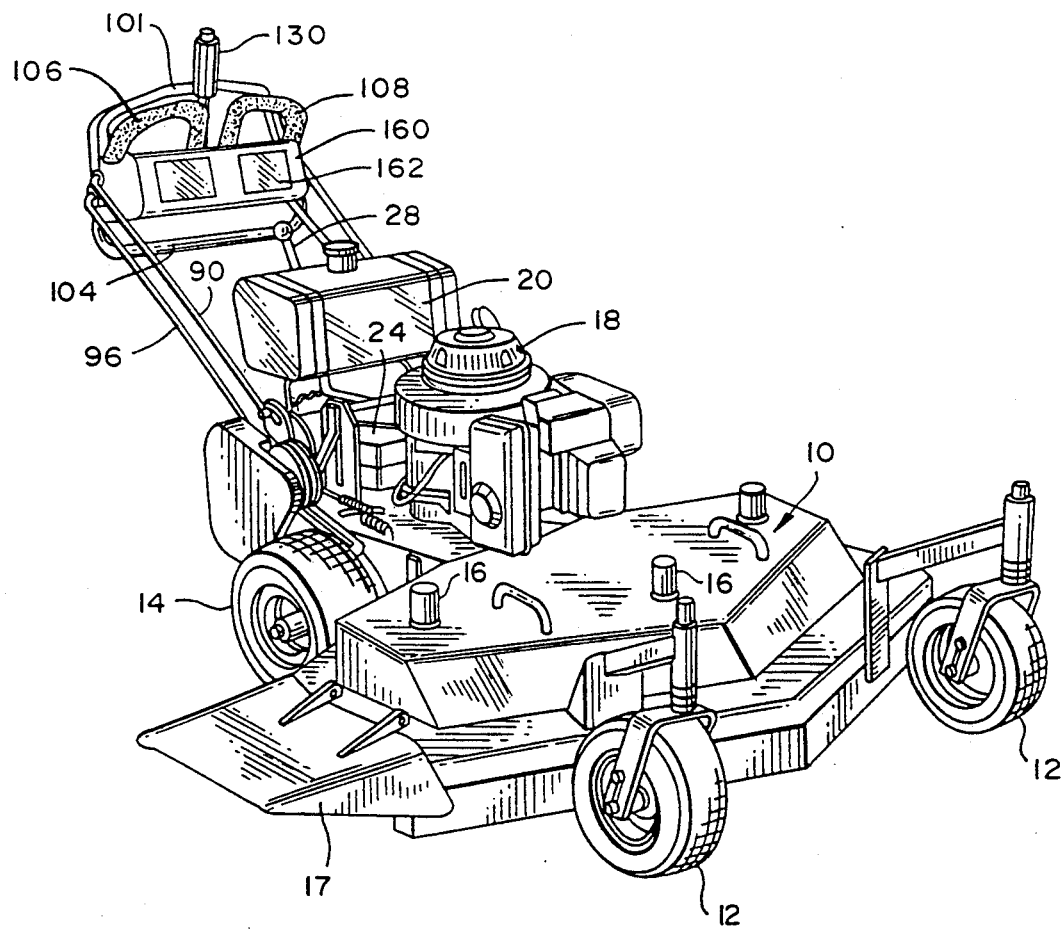
FIG_1

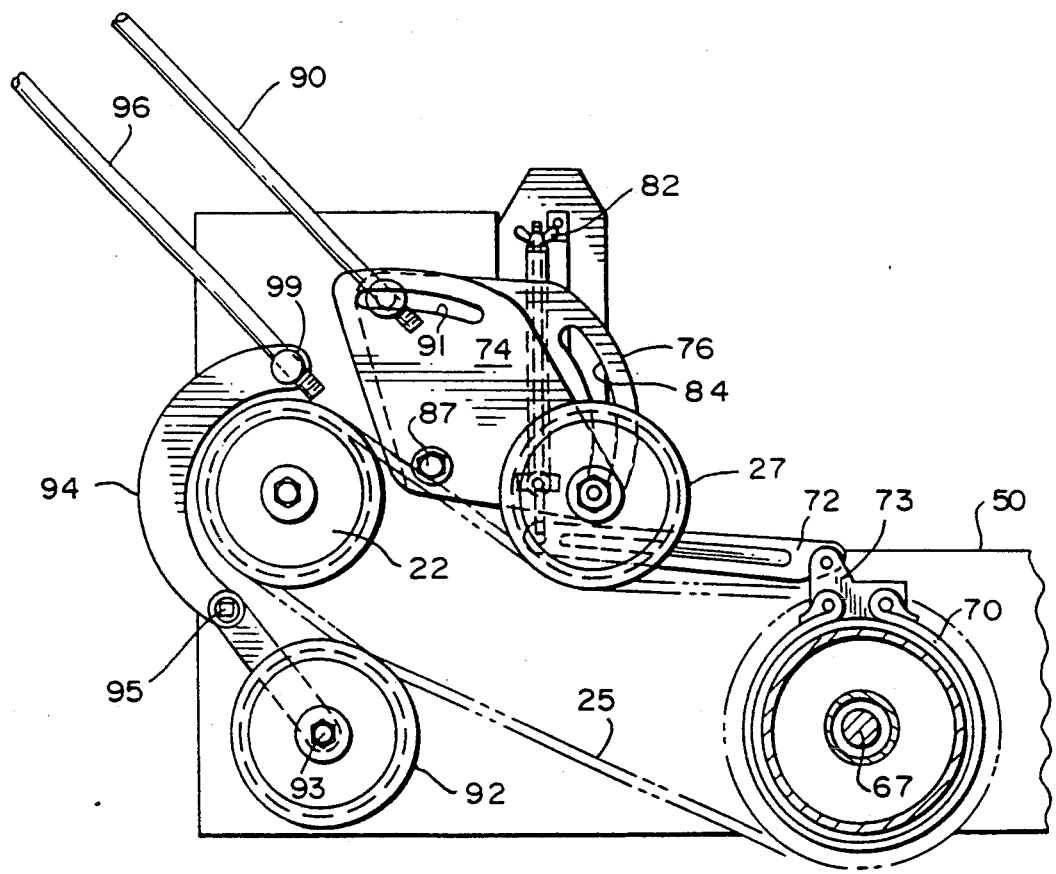
FIG_2

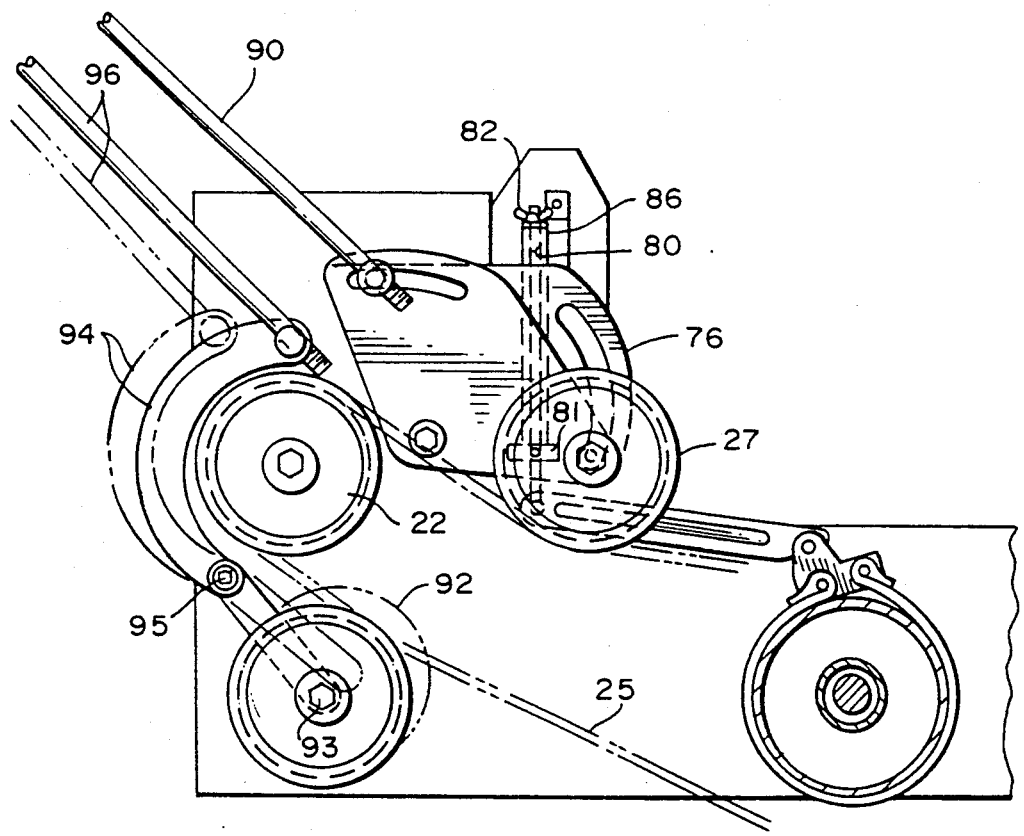
FIG_3

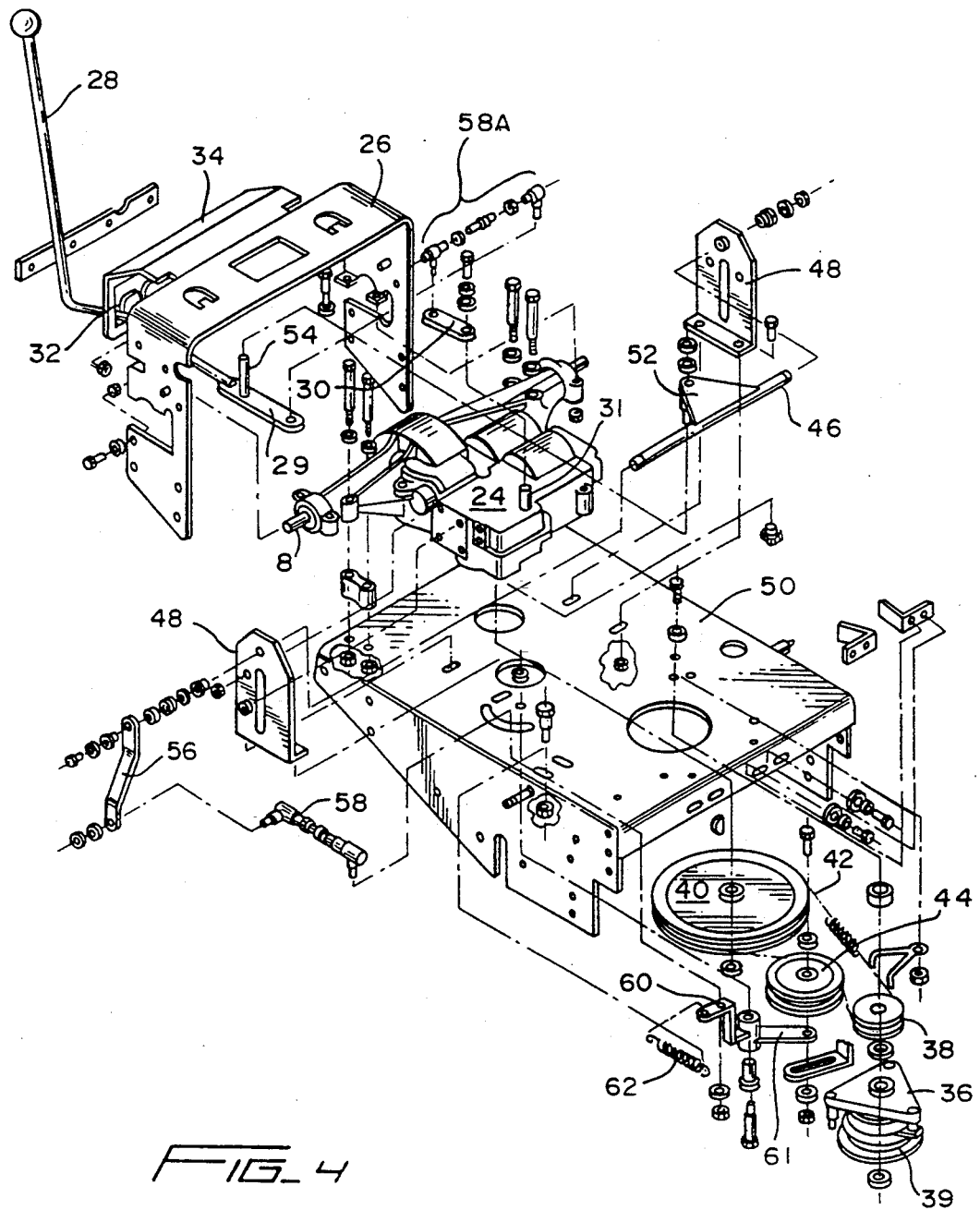
FIG_4

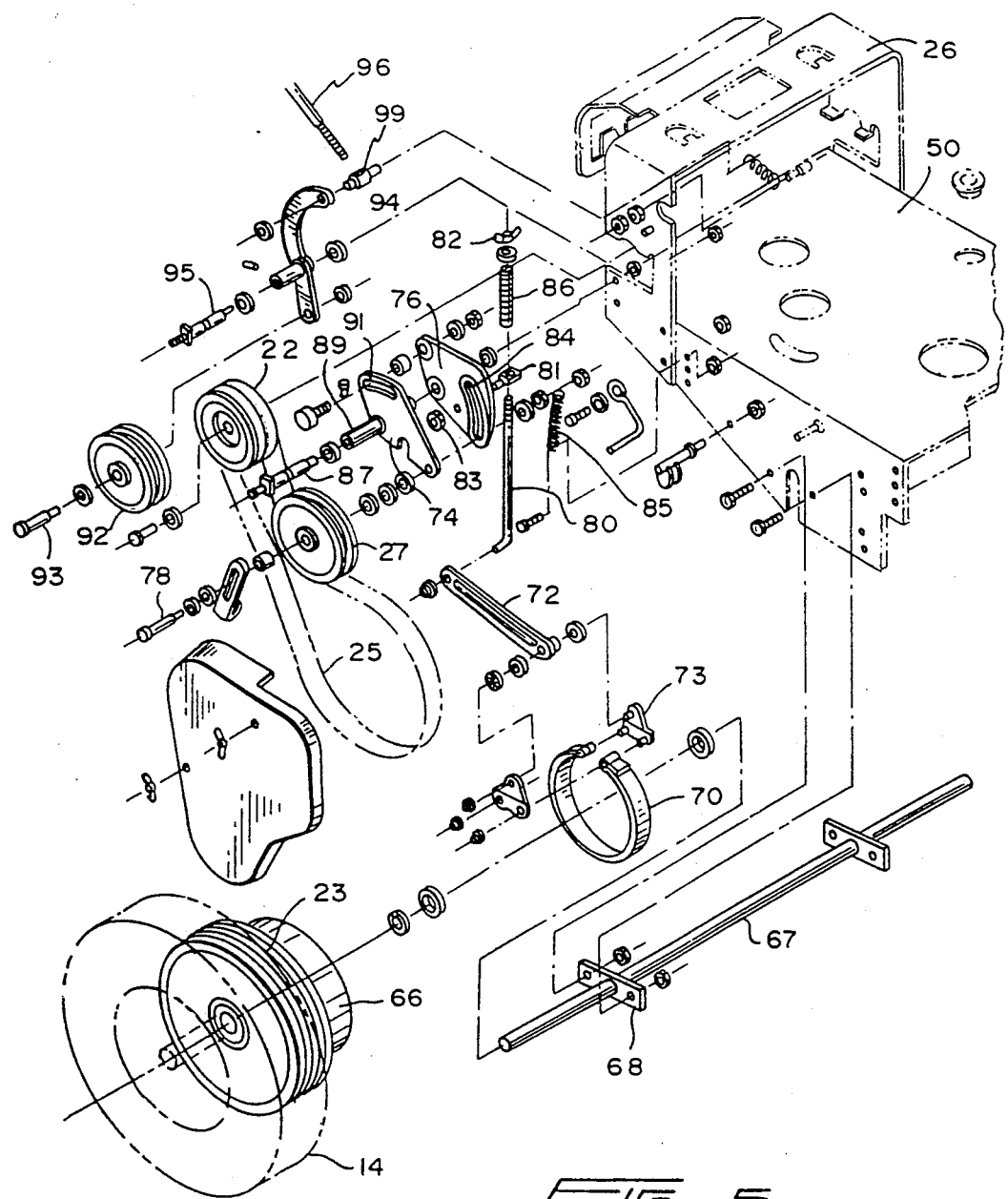
FIG_5

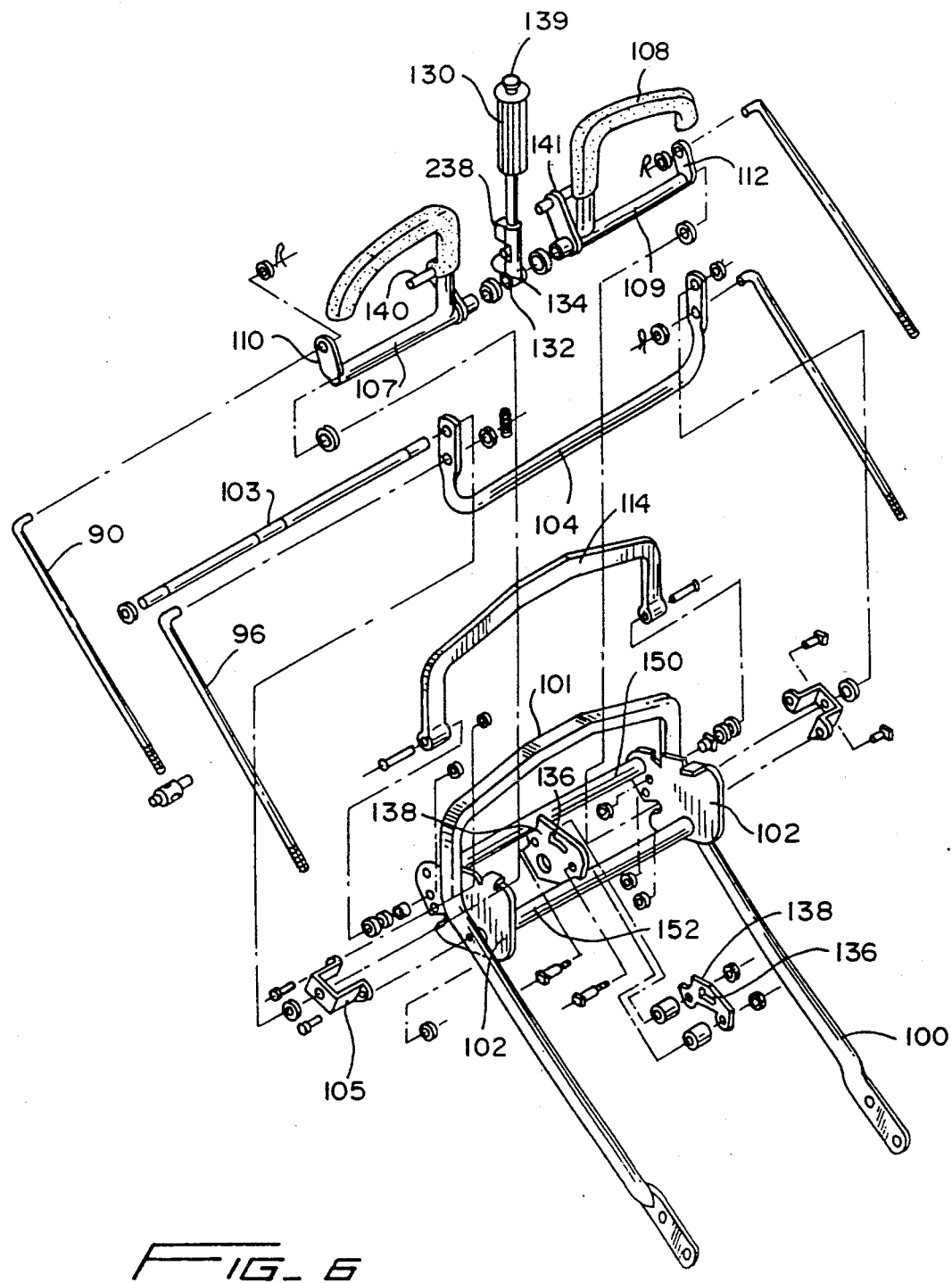
FIG_6

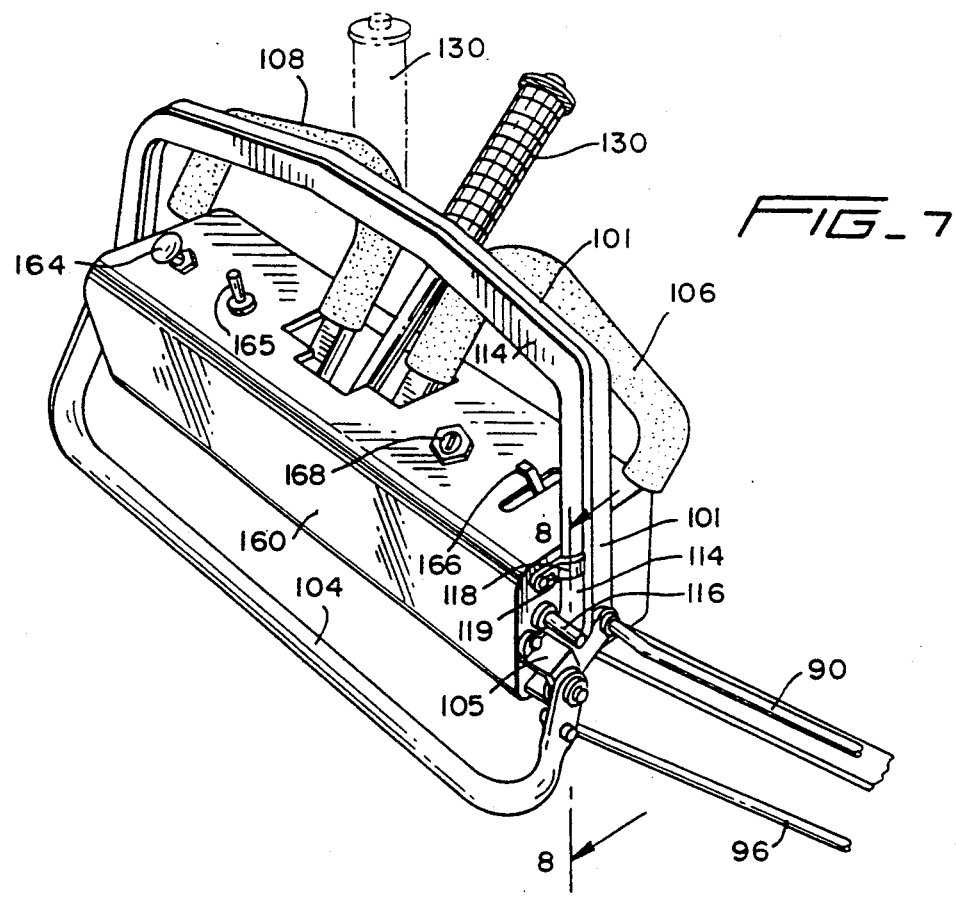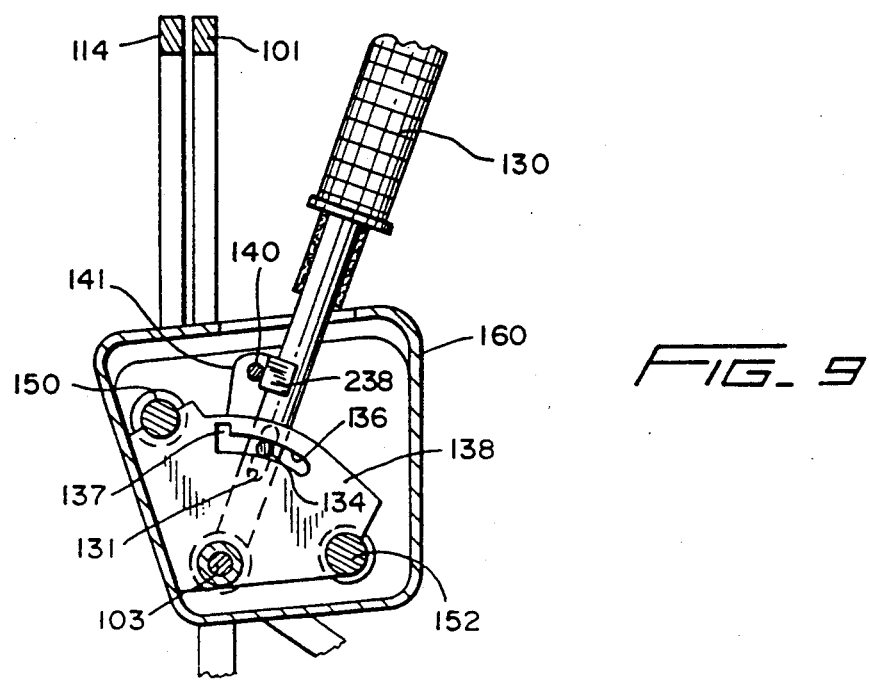

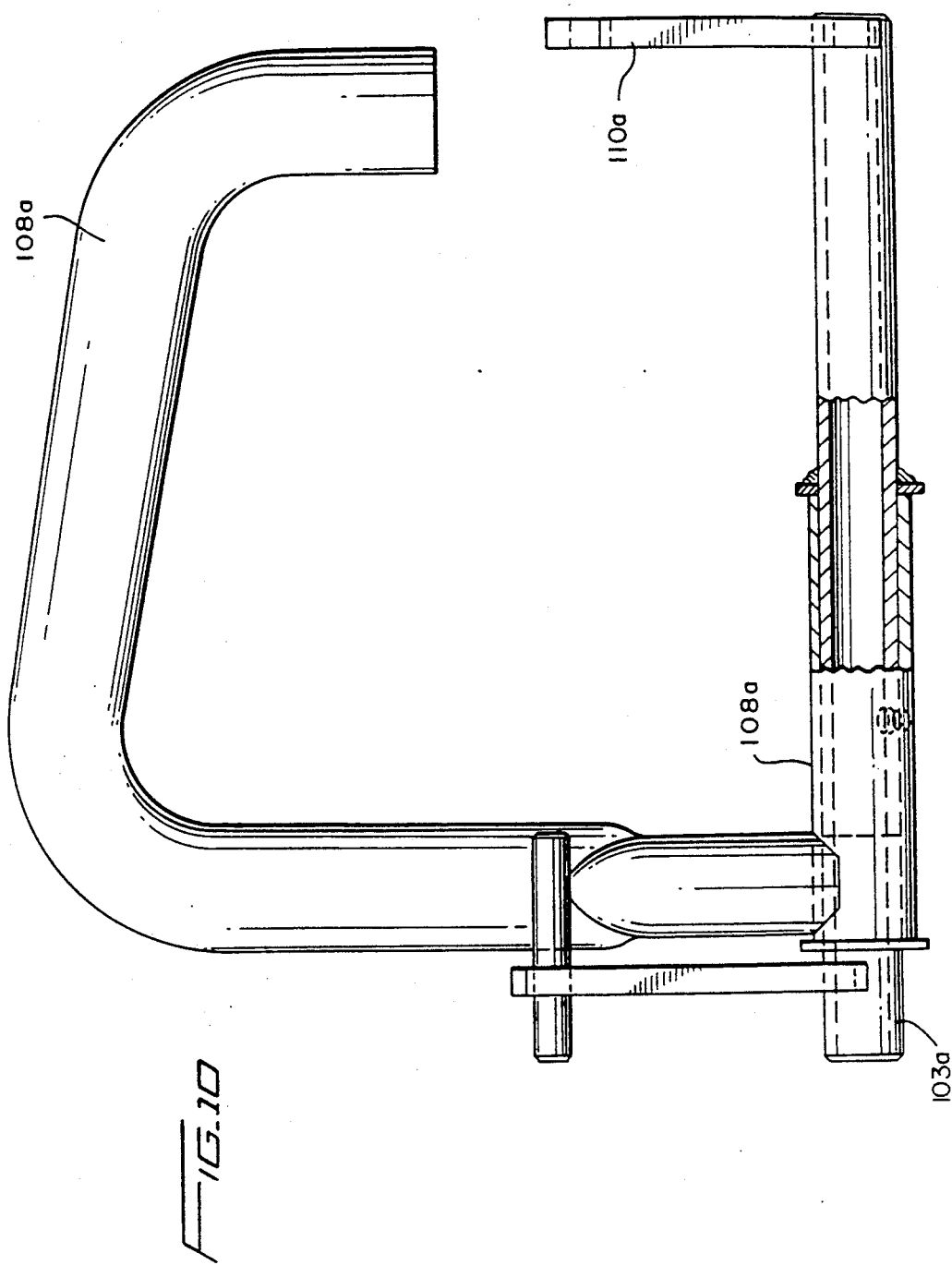

LAWN MOWER DRIVE AND CONTROL SYSTEMS

BACKGROUND OF INVENTION

The present invention relates to lawn mowers of the mid-size, walk-behind, type known as commercial lawn mowers; and more specifically to control systems incorporated in such mowers. Although particularly suitable for commercial type lawn mowers, the present invention need not be limited to such mowers but will have applicability in other types of mowers.

Prior art mowers of this type typically have two squeeze-type control levers on opposite sides of handle bars controlling the drive and braking to two driving wheels respectively located at the rear of the mower. Each of the drive wheels is driven through an associated drive pulley which is driven through a transmission deriving its power from an engine. Pulley belts interconnect the drive pulleys and the driven wheels respectively, and tension is normally applied to the pulley belts by idler pulleys which are biased into engagement with the pulley belts to establish tension for driving the wheels. When the transmission is shifted into an appropriate gear and the control levers are released, the mower will move forwardly. In order to make a right turn the right hand lever is depressed to disengage the idler pulley from the associated pulley belt and at the same time to apply a brake to the right hand wheel. The mower will turn to the right because the left wheel is still being driven while the right wheel is braked. To make a left hand turn the opposite situation is effected, and to bring the mower to a complete stop, both levers are depressed.

Due to the position of the control levers and the fact that use of the mowers over extended periods can fatigue the hands due to the force necessary for braking, attempts have been made to improve the drive and control system for such mowers. By way of illustration reference may be had to U.S. Pat. No. 4,558,558 Horner et al issuing Dec. 17, 1985 which provides a control system intended to improve the aforementioned system. In the Horner et al system, the idler pulleys controlling tension in the drive pulley belts are normally disengaged from the drive pulley belts so that when the control lever 20 is released, no forward drive is transmitted to the driven wheels. In addition Horner provides a single lever or bail 20 for controlling both of the driven wheels. In order to move forwardly with the mower, the lever 20 is pivoted forwardly. To make a gradual turn, the operator merely presses forward on one end 22 of bail 20. The pulley belt on the side corresponding to the selected end will engage the wheel drive on that side while the other wheel drive remains disengaged and the mower will turn in the direction opposite to the engaged wheel. That is, pushing forward on the right end 22 of board 20 will cause the unit to turn left, and vice versa. To make a sharp turn, the operator presses forward on one end 22 of bar 20 while pulling rearwardly on the other end of bar 20. To apply the brakes to stop ground travel, the operator merely pulls bar 20 evenly to the rear; and to hold the brakes in the engaged position for parking, the operator swings a brake lever 50 forwardly and upwardly from a storage position against tube 38 and wedges the lever 50 against a stationary hand rest 19. The free end of lever 50 has a concave shape to nestle over handrest 19 and remains in place until the operator releases it by pulling back further on bar 20 and returning lever 50 to its storage position against tube 38.

OBJECTS OF THE PRESENT INVENTION

One of the objects of the present invention is to provide a walk-behind lawn mower of the type identified above but which incorporates improved systems for driving and controlling the various operations of the mower including forward and rearward travel, turning and braking of the mower. Included herein is such a lawn mower having individual controls for transmitting drive or braking to associated driven wheels of the mower and which require only fingertip pressure while allowing the hands freedom to be moved into several comfortable positions providing excellent maneuverability.

Another object of the present invention is to provide a walkbehind lawn mower having individually controlled driven wheels and which at the same time incorporates a novel and improved parking brake system for braking both of the wheels while the engine of the mower is operating or deenergized.

A further object of the present invention is to provide a walk-behind lawn mower of the type mentioned above and which incorporates a novel and improved drive system for positively driving the mower in reverse.

Another object of the present invention is to provide a lawn mower having a transmission which is automatically declutched from the engine when changing gears to reduce load from shifter keys.

A still further object of the present invention is to provide a walk-behind lawn mower having a novel control system for controlling individually drivable wheels and at the same time automatically declutches the transmission of the mower each time the gear shift is moved to change gears.

A still further object of the present invention is to provide a walk-behind lawn mower of the type which will achieve the above objects and yet will meet industry standards including those imposed by the Consumer Products Safety Commission. Included herein is such a lawn mower which includes a dead man control which upon release will cause the engine to stop if the mower is in gear or a blade clutch switch is on.

SUMMARY OF INVENTION

In summary, a preferred embodiment of the present invention includes a pair of individual control levers mounted to be moved against a transverse handlebar of a walk-behind lawn mower to apply or release a brake on an associated driven wheel. When the lever is released, the associated wheel will be driven through a drive pulley and belt tensioned by an idler pulley. When the lever is pressed against the handlebar, the idler pulley will be moved away from the pulley belt against its spring bias and at the same time a brake will be applied to the associated wheel. Both hand levers extend generally parallel to the fixed handlebar providing a convenient gripping and holding surface to the operator. In order to apply both brakes to the wheels, when the engine is still operating or still, a hand brake lever referred to as "park brake lever", is provided, preferably between the control levers, to be movable in one direction for applying both brakes and to be movable in an opposite direction for releasing both brakes. The park brake lever has a latch mechanism with push button control for releasably holding the park brake in the braking position.

In order to drive the mower in reverse, a separate bail is pivotally mounted relative to the handlebar to be pivotable rearwardly to engage reverse idler pulleys associated with both driven wheels to establish drive for moving the mower in reverse. Several different forward speeds are imparted to the mower through means, preferably a gear transmission operated off the engine of the mower and having a shift for changing gears. Each time the shift is moved to change gears, the transmission is declutched from the engine to reduce load during shifting. In addition to the above controls, the mower is also provided with a dead man's control which in this application is also termed an "operator's presence bail" which must be held against the stationary handlebar during operation. This is convenient to perform since the operator's presence bail follows the contour of the fixed handlebar and lies against the fixed handlebar and therefore may be easily grasped during operation. Release of the operator's presence bail while the mower traction drives are in gear or a blade clutch switch is in the on position, will cause the engine to immediately stop. This is effected through a switch engagable by the operator's presence bail when released.

DRAWINGS

Other objects and advantages of the present invention will become apparent from the following more detailed description taken in conjunction with the attached drawings in which:

FIG. 1 is a perspective view of a power driven, walk-behind, lawn mower constituting a preferred embodiment of the present invention;

FIG. 2 is an enlarged side elevational view of a pulley and belt drive system for driving the right hand wheel of the mower and with portions of the mower broken away for clarity;

FIG. 3 is a view generally similar to FIG. 2 but showing, in phantom lines the position of a reverse drive idler pulley when it is moved to drive the mower in reverse;

FIG. 4 is an exploded perspective view of a portion of the mower showing the pulley and belt drive system for the transmission and the transmission for the drivable wheels and the shift for shifting gears in the transmission;

FIG. 5 is an exploded perspective view of the right hand pulley and belt drive system for the right hand driven wheel of the lawn mower;

FIG. 6 is an exploded perspective view of the handlebar of the mower and associated controls for the driven wheels and dead man's control;

FIG. 7 is an enlarged, fragmental view in perspective of the control levers associated with the handlebar of the mower as seen from the rear of the mower and with the braking position of the park brake lever shown in phantom lines;

FIG. 9 is a fragmental, cross-sectional view taken generally along lines B—B of FIG. 8; and FIG. 10 is an enlarged front elevational view of a modified control handle and its mounting assembly which may be employed in another embodiment of the present invention.

DETAILED DESCRIPTION

Figure 8:
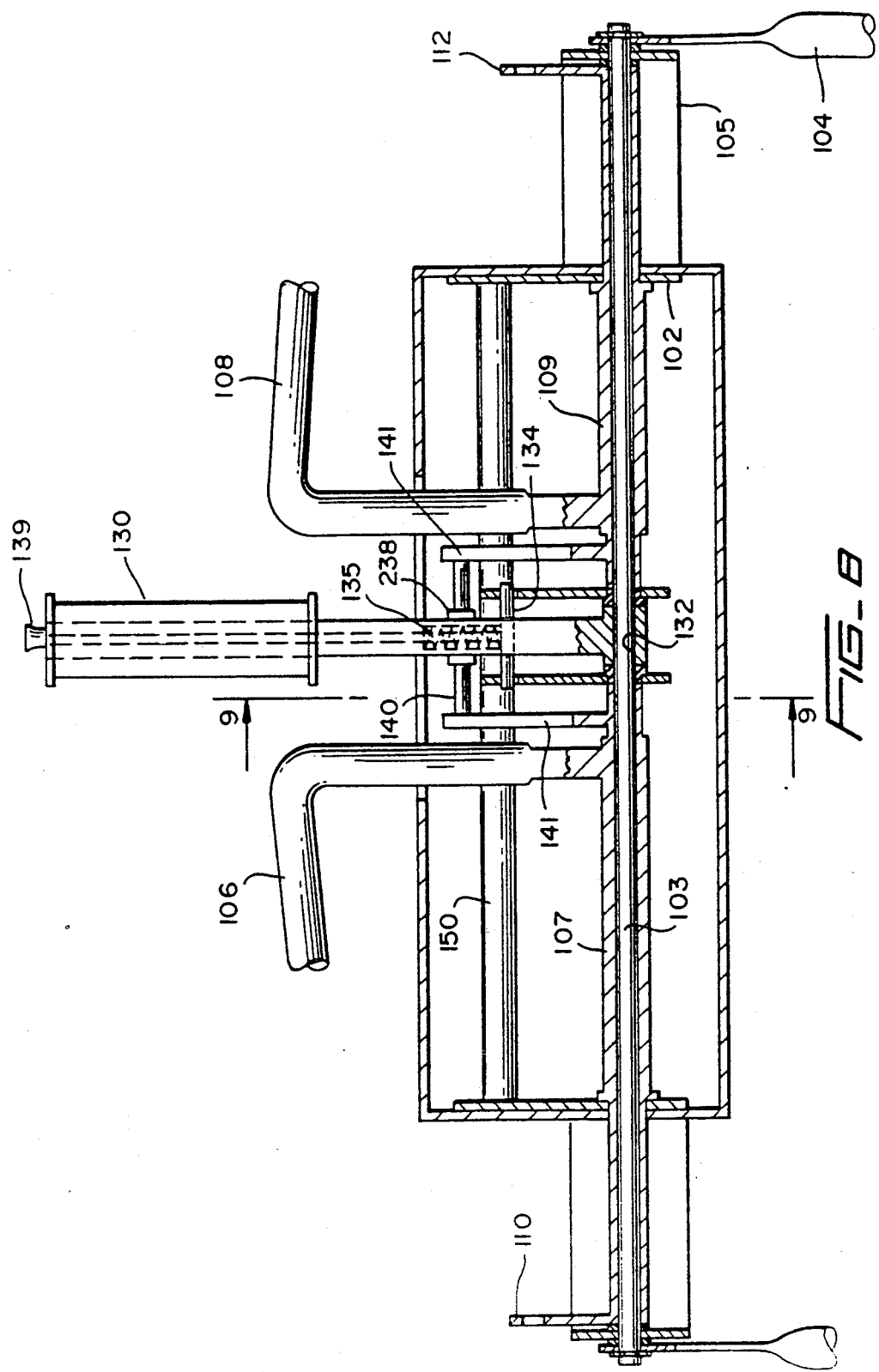
FIG. 8 is an enlarged cross-sectional view taken generally along lines A—A of FIG. 7.

Referring now to the drawings in detail and initially to FIG. 1, there is shown for illustrative purposes only a walk-behind, commercial-type lawn mower constituting a preferred embodiment of the present invention including a blade housing generally designed 10 having a deck which extends in a generally horizontal plane to opposite sides of the mower and being supported on the ground by front wheels 12 and rear wheels 14 the latter being power driven wheels. Blade housing 10 of course houses a plurality of cutting blades not shown in FIG. 1 mounted on vertical shafts 16 for rotation in horizontal planes in well known manner which need not be repeated here. Grass cut by the blades is discharged laterally of the housing under the deflector 17. Power for driving the cutting blades as well as the wheels 14 is provided by an engine 18 and in the particular embodiment shown, the engine is gasoline driven, a gas tank being shown at 20. Engine 18 may be for example 14 or 18 horsepower, and it drives the wheels preferably through a gear transmission 24 having five forward speeds and one reverse speed.

When engine 18 is started, both wheels 14 should be braked and this is effected by a park brake lever 130. In order to move the mower in forward direction, a shift lever 28 is shifted into the proper position and park brake 130 is released. To turn right for example, a control lever 106 is pressed rearwardly against a fixed transverse handlebar 101 to release drive to the right- hand wheel 14 and at the same time to apply a brake to right hand wheel 14. Since the left hand wheel is still being driven, the mower will turn to the right. The sharpness of the turn is controlled by the amount of pressure applied to control lever 106. The left hand wheel is controlled by lever 108. In order to drive the mower in reverse, gear shift 28 is moved into the reverse position and then a reverse control lever or bail 104 is pivoted rearwardly to simultaneously establish drive to both of the rear wheels 14 for reversing the mower. If desired, the brakes may be applied while the mower is moving in reverse. Each time gear shift 28 is shifted to change gears, the transmission 24 is automatically declutched from engine 18. The aforementioned controls as well as a dead man control will now be described below in greater detail.

Referring now to FIGS. 2, 3 and 5, the drive and braking system for the right hand wheel 14 is disclosed as including a pulley belt 25 at trained one end about a circumferential pulley portion 23 on the hub of wheel 14 and at an opposite end about a drive pulley 22. The hub of wheel 14 is mounted on an axle 67 which in turn is mounted by brackets 68 to sidewalls of a frame 50 located rearwardly of the blade housing 10. Drive pulley 22 is mounted on one end of the output shaft 8 of the transmission 24 shown in FIG. 4 as being housed in frame 26. To establish drive to wheel 14, tension is applied to pulley belt 25 by means of an idler pulley 27 which is mounted to an idler arm 74. The latter is mounted for pivotal movement by means of bolt 87 extending through a tube 89 through arm 74 in turn mounted to frame 26. A brake arm 76 to be described below is mounted for pivotal movement relative to idler arm 74 on the tube 89 of the idler arm 74. In the specific embodiment shown idler pulley 27 is mounted by a bolt 78 received through idler arm 74 and in a slot 84 of bracket 76 as best shown in FIGS. 2 and 5. Pivotal movement of idler pulley 27 in a clockwise direction as viewed in FIG. 2 will apply tension to pulley belt 25 to establish drive from drive pulley 22 to the associated hub of the right hand wheel 14 to drive the same in a forward direction. Speed of movement is dependent upon gear selection in transmission 24 made through gear shift 28 as noted above. Pivotal movement of idler pulley 27 in a counter-clockwise direction as viewed in FIG. 2 will serve to remove tension from pulley belt 25 for decreasing or disconnecting drive from the drive pulley 22 to the hub of wheel 14. Pivotal movement of the idler pulley 27 in the preferred embodiment shown is achieved through an elongated rod 90 having one end fixed in a slot 91 of arm 74 and an opposite connected to a flange 110 of a hollow shaft 107 which is fixed to the associated control lever 106 as shown in FIG. 6. Referring to FIG. 7, when control lever 106 is released, idler pulley 27 will engage pulley belt 25 to establish drive between drive pulley 22 and wheel 14. In this latter regard, idler pulley 27 is biased by spring 85 (see FIG. 5) having one end fixed relative to frame 50 and the other end connected to the idler pulley to normally bias the idler pulley downwardly into engagement with pulley belt 25 to establish drive. When control lever 106 is pivoted rearwardly against handlebar 101, this will serve to move rod 90 rearwardly and upwardly causing idler pulley 27 to pivot in a counter-clockwise direction as viewed in FIG. 2 to release tension on pulley belt 25 and to decrease or disconnect drive from drive pulley 22 to wheel 14.

When the shift lever 28 is moved into reverse for driving the mower in the reverse direction, a second idler pulley namely 92 is utilized for establishing drive between drive pulley 22 and the wheel 14. This pulley which may be termed a "reverse idler pulley" is shown in FIGS. 2 and 3 as being mounted on a lever 94 pivotally mounted intermediate its ends by a pivot pin 95 mounted in frame 26 as shown in FIG. 5. Reverse idler pulley 92 is mounted by a bolt 93 to the lower end of lever 94 for movement into and out of engagement with pulley belt 25. FIG. 2 shows reverse idler pulley 92 in the idling position where it has no tensioning effect on pulley belt 25 when the mower is in the forward speed mode where upper idler pulley 27 comes into play. When it is desired to move the mower in reverse direction, shift lever 28 is moved to the reverse position to engage the reverse gears in transmission 24. Then a reverse control lever or bail 104 is pivoted rearwardly relative to stationary handlebar 101 of the mower. This pulls connecting rod 96 rearwardly and upwardly to pivot lever 94 about pivot 95 to bring reverse idler pulley 92 into engagement with the lower run of pulley belt 25 to tension the same and establish drive between drive pulley 22 and driven wheel 14. This drive establishing position of pulley 92 is shown in phantom lines in FIG. 3 and although not shown in FIG. 3 the upper run of belt 25 will be moved upwardly when the lower run is engaged by reverse idler pulley 92 to disengage drive with upper pulley 27 which will also be moved upwardly against its biasing spring. As shown in FIGS. 2 and 5, the lower end of connecting rod 96 is connected to lever 94 by means of a pivot 99 received in lever 94 and having a threaded aperture receiving threads on the lower end of rod 96.

Referring to FIGS. 6 and 7, the upper end of connecting rod 96 is mounted in one end of reverse bail 104. The latter is mounted by a bracket 105 to an associated mounting plate 102 fixed to handlebar 101 as best shown in FIG. 6; there being two mounting plates 102 fixed to the handlebars 100 respectively.

At the same time that idler pulley 27 is disengaged from pulley belt 25 to disconnect drive to the associated wheel, the brake of the associated wheel is applied. In the preferred embodiment shown in FIG. 5, this is accomplished by a brake rod 80 extending generally vertically from its upper end where it is connected to brake arm 76 by a nut and pin assembly 81 and 83. The lower end of rod 81 is bent outwardly to be pivotally received in a brake lever 72 whose forward end is connected to a brake band 70 by means of a link 73.

Brake band 70 is engagable about a brake drum 66 in well-known manner when link 73 is actuated by brake lever 72 to tighten band 70 about the drum. As noted above, brake lever 72 is actuated simultaneously with the actuation of idler pulley 27 away from pulley belt 25. When the operator releases the associated control lever 106 the idler pulley 27 will return to engagement with pulley belt 25 and at the same time brake band 70 will be relaxed away from drum 66 to release the brake on wheel 14. In the preferred embodiment, the upper end of brake rod 80 is provided with threads for adjusting the vertical position of the brake rod 80 relative to brake arm 76 by merely turning a wing nut 82 engaged on the threads of the brake rod. As also shown in FIG. 2, a coil compression spring 86 is mounted about rod 80 between wing nut 82 and nut 81. This assembly is used for adjusting brake band 70 to increase or decrease braking pressure upon application of control lever 106. Moreover, the adjustment may be made while the mower is being operated in forward direction. Since the brake arm 76 is mounted for movement relative to idler arm 74, the brakes 70 may be applied when the mower is in reverse. Moreover, due to the independent brake arm 76 which allows idler 27 to raise without moving brake arm 76, the reverse drive may be effected without applying the brakes.

Although the above description is directed to the drive and braking of the right hand driven wheel 14, it is obvious that the left hand driven wheel 14 will have a similar pulley and belt drive and braking system and controls. Referring to FIGS. 6, 7 and 8, the control for the right hand wheel will include hand lever 106 and for the left hand driven wheel, the hand lever 108. Each hand lever 106 and 108 extends generally parallel to the fixed handlebar 101 while being symmetrically located on opposite sides of the handlebar 101. Levers 106 and 108 may be conveniently held together with handlebar 101 and the operator's presence bail 114 which is located behind handlebar 101, with the control levers 106 and 108 being located in front of handlebar 101. Therefore with the same simple gripping action, the operator may control the drive and braking to the wheels, steering, and at the same time maintain the operator's presence bail 114 in the proper position to allow mowing operations.

As shown in FIGS. 6 and 8, levers 106 and 108 are fixed to or formed integral with a pair of associated hollow shafts 107 and 109 mounted for rotation about a shaft 103 which extends through the ends of the reverse control bail 104 and is mounted in brackets 105 which bolt to brackets 102 on opposite handlebars 100; the brackets 102 being further secured by a pair of tubes 150 and 152 extending between and fixed to plates 102 as best shown in FIG. 6. Projecting upwardly from the end of hollow lever shafts 107 and 109 are mounting flanges 110 and 112 which are apertured to receive connecting rods 90 for operating the forward drive idler pulleys 27 as described above. This control is of course effected by rotating control levers 106 and 108 about shaft 103 rearwardly for applying brakes or turning, and upon release of the controls the levers 106 and 108 will be automatically returned to their spaced position due to the spring bias on the idler pulleys 27 as described above. It will also be seen that in order to engage the reverse idler pulley 92, it is merely necessary to pivot reverse belt 104 rearwardly about shaft 103 which in turn will raise connecting rod 96 upwardly to pivot reverse idler pulley 92 into engagement with the pulley belt 25 as described above. In another embodiment of the invention shown in FIG. 10, control levers 108a are mounted on tubes 103a which are mounted on shaft 103. Tubes 103a have flanges 110a which connect to rod 90. Motion of levers 108a is transmitted to tubes 103a by arms 1.

In order to apply both brakes to wheels 14 at the same time to stop the mower while the engine is still running and without requiring that the individual control levers 106 and 108 be depressed and held against handlebar 101, a single park brake control is provided. Referring to FIGS. 6 through 9, in the preferred embodiment, the park brake control includes a park brake lever generally designated 130 located centrally of the handlebar 101 midway between the control levers 106 and 108. Park brake lever 130 has in its lower end a transverse mounting passage which receives shaft 103 to pivotally mount park brake lever 130 for movement about shaft 103 for applying and releasing the brakes to wheels 14. To this end, hollow mounting shafts 107 and 109 of levers 106 and 108 have upstanding arms 141 fixed thereto to be pivotally rotatable with levers 106 and 108. Each of the arms has a stop pin 140, 141 fixed thereto and extending inwardly to the rear of park brake lever 130 so that they are engagable by a lug 238 fixed to a rear surface of park brake lever 130, see FIGS. 8 and 9. In order to apply both brakes simultaneously, park brake lever 130 is merely pivoted about shaft 103 rearwardly causing lug 238 to engage pins 140 to rotate hollow shafts 107 and 109 for actuating both connecting rods 90 for disengaging idler pulleys 27 from the pulley belts 25 and at the same time applying brake bands 70 to engage brake drums 66 of wheels 14.

In order to hold park brake lever 130 in the braking or operative position, a releasable latch mechanism is provided which in the preferred embodiment shown includes a latch pin 134 extending transversely through park brake lever 130 in slots 131 provided in opposite walls of park brake lever 130 which is hollow. Looking pin 134 is biased upwardly in the slot 131 of the park brake lever 130 by means of any suitable biasing mechanism such as the coil spring 135 illustrated in FIG. 8. In order to hold locking pin 134 for releasably locking the park brake lever 130 in the braking position, a keeper is provided which in the preferred embodiment includes a pair of latch plates 138 fixed to and between rods 150 and 152 which are secured to the mounting plates 102 as described above. Latch plates 138 are therefore mounted in side-by-side relationship on opposite sides of park brake lever 130 and each has an arcuate slot 136 for receiving opposite ends of latch pin 134. Slots 136 are of course in register with each other and at one of their ends contain an enlarged portions (see FIG. 9) extending upwardly for receiving latch pin 134 when park brake lever 130 is pivoted rearwardly to apply the brakes. When the latter occurs, biasing spring 135 of latch pin 134 will move latch pin 134 into the enlarged slot portion 137 to maintain park brake lever 130 in the braking position. In order to release park brake lever 130 to release the brakes, a push button 139 at the top of the park brake lever is merely depressed to lower latch pin 134 out of the enlarged slot 137 whereupon the parking brake lever 130 is pivoted forwardly to release the brakes and engage idlers 27. Motion is transmitted from push button 139 to latch pin 134 by means of an intervening rod about which biasing spring 135 is mounted. It will be understood that any other suitable latch mechanism may be provided other than that specifically shown and described. It will be seen that park brake lever 130 is easily manipulated by single hand while at the same time allowing the other hand to maintain the operator's presence bail 114 against handlebar 101. Moreover applying the park brake is a one-step operation requiring only that the park brake lever 130 be pivoted rearwardly until locking pin 134 is automatically received in slots 137 of latch plates 138. Release of the park brake is equally a simple matter requiring only the push of button 139 and movement of lever 130 forwardly.

Referring now to FIG. 4, each time gear shift 28 is moved to change gears, drive to the transmission will be disengaged. This is effected by connection between gear shift lever 28 and idler pulley 44 which tensions or releases pulley belt 42 which drives pulley 40 connected to the input shaft of the transmission 24. The drive comes from the engine 18 through drive pulley 38 shown in FIG. 4 which also shows pulley 39 which is used to drive the cutting blades through belts and pulleys (not shown). In the preferred embodiment. Shift lever 28 has a mounting arm 29 connected by linkage 58a to link 30 to a shift rod 31 for shifting gears in the transmission. The connection to idler pulley 44 is made through an upstanding pin 54 fixed to mounting arm 29 of shift lever 28. Pin 54 is operatively connected to idler pulley 44 through a rod and linkage assembly including rod 46, lever 56, linkage 58 and idler pulley bracket 60, 61 to be described. In order to shift the shift lever 28 from one position to another position, it is necessary to raise it out of slot 32, move it transversely into another slot 32 and then lower it into that slot. The initial lifting action of shift rod 28 is utilized to actuate rod 46 about a horizontal axis; rod 46 being mounted in brackets 48 fixed to frame 50. Rod 46 has an intermediate flanged portion 52 having a socket which receives connecting pin 54 of shift lever 28. It will be seen that each time shift lever 28 is raised preliminarily to changing gears, the upward motion of shift lever 28 will pivot rod 46 in a clockwise direction as viewed in FIG. 4. This motion is transmitted to actuating lever 56 one end of which is connected to rod 46 to pivot with the rod and the other end of which is connected to connecting link assembly 58 which in turn is connected to an arm 60. The latter projects from a mounting sleeve used to mount idler pulley 44 by means of an arm 61 projecting from the sleeve and to which pulley 44 is mounted. When actuating lever 56 is moved clockwise as viewed in FIG. 4 upon initial shifting of gears, this will rotate the mounting sleeve of idler pulley 44 also in a clockwise direction as viewed in FIG. 4 to disengage idler pulley 44 from the pulley belt 42 to disconnect drive to the pulley 40 and in the transmission 24. When shift lever 28 is moved into its next operative position, a biasing spring 62 will become effective to restore driving engagement between pulley 44 and pulley belt 42 for reengaging drive to the transmission.

When the mower is in gear, that is, with gear shift 28 in one of the several operative positions rather than neutral position where drive gears are not engaged, an electrical circuit is established through engine 18 such that in order to continue spark, operator's presence bail 114 must be held against stationary handlebar 101. Should operator's presence bail 114 be released while the mower is in gear, electrical contact will be made at 118, 119 (see FIG. 7) to ground the electrical circuit of the engine and thereby cause the engine to stop running. Such stoppage however will not occur if the gear shift 28 is in the neutral position. An additional safety feature is provided in a blade clutch switch shown at 165 in FIG. 7 where it is mounted to a panel extending between handlebars 100 below handlebar 101 and operator's presence bail 114. Once blade clutch switch 165 is turned to the on position, it is necessary to hold operator's presence bail 114 against handlebar 101 in order to avoid activation of a grounding circuit which will cut off power to the engine. Therefore should operator's presence bail 114 be released while the mower is in gear or blade clutch switch 165 is in on position, engine 18 will stop. In another embodiment shown in FIG. 10 control switches are provided on mounting tubes 103a, 103b and brackets welded to cross tubes 152.

In addition to blade clutch switch 165, a headlight switch 164 is mounted in panel 160 as is a throttle control 166. An ignition switch 168 for receiving a key is also mounted in control panel 160. All of the aforementioned controls are thus conveniently located below handlebar 101 so that for example the engine speed may be adjusted with throttle control 166 without removing the hands from the traction control levers 106, 108. Furthermore the control levers 106, 108 may be easily manipulated to achieve "zero turning" or gradual turns and the independent, reversing idler pulley avoids the problem attendant conventional pulley drive systems which tend to brake the traction wheels when operating in reverse. At the same time, if desired the brakes may be applied to the traction wheels when operating in reverse. In addition in the preferred embodiment, the front of panel 160 as shown in FIG. 1 is provided with a pair of lenses 162 behind which are lamps for illumination.

It will thus be seen that the lawn mower controls of the present invention provide a high degree of safety as well as maneuverability in the operation of the mower while minimizing or avoiding fatigue to the hands that would otherwise result from operating the controls of the prior art.

Although not shown, the lawn mower drive and control system of the present invention may also be provided with two additional levers placing the pulley drive and brake system in a neutral position. Although a specific preferred embodiment has been shown and described above, it will be understood that the scope of the present invention is not necessarily limited to the preferred embodiment but rather is defined in the appended claims. Indeed the control system of the present invention may be applied to other types of mowers and drive systems for example hydraulic or hydrostatic systems.

What is claimed is:

1. In a power driven walk-behind lawn mower having a pair of drivable wheels, two drives for establishing drive to said wheels respectively and two brakes for braking said wheels respectively, and a handlebar extending generally transversely of the mower for operating the mower; the improvement comprising a control system for operating the drives and brakes comprising in combination, two individual hand levers laterally spaced from each other and extending generally parallel to the handlebar, said hand levers being pivotable towards and away from said handlebar for controlling the drives and brakes of the wheels respectively and an individual park brake lever located between said hand levers for simultaneously applying the brakes to both of said wheels.

2. The combination defined in claim 1 wherein said park brake lever is pivotable about a horizontal axis between a first position for applying the brakes and a second position for releasing the brakes.

3. The combination defined in claim 1 wherein there is further included a dead man control lever mounted for pivotable movement on one side of said handlebar towards and away from said handlebar, and wherein said hand levers are mounted on the opposite side of said handlebar.

4. The combination defined in claim 3 wherein said dead man control lever conforms to the shape of the handlebar.

5. The combination defined in claim 1 wherein said park brake lever is engagable with portions of said hand levers when moving into said first position.

6. The combination defined in claim 5 further including a shaft extending in a generally horizontal plane, and wherein said hand levers and said park brake lever are mounted for pivotable movement about said shaft, and wherein there is further included latch means for releasably holding and park brake lever in said first position.

7. In a power driven mower including two drivable wheels, two brakes associated with the wheels for braking and releasing the wheels, and a handlebar for operating the mower; the improvement comprising a park brake lever pivotally mounted on the handlebar between a first position for applying both brakes and a second position for releasing both brakes, a releasable latch means holding said park brake lever in said first position, a pair of hand levers mounted adjacent and on opposite sides of the park brake lever and means engaging the hand levers with the park brake for applying the brakes through the hand levers.

8. The combination defined in claim 7 wherein said means for releasably holding the park brake lever in said first position includes a latch plate, a locking pin mounted to the park brake lever and engagable in said latch plate.

9. The combination defined in claim 8 wherein said means for releasably holding the park brake lever in said first position includes a push button on the park brake lever for releasing the latch pin for movement relative to the latch plate.

10. The combination defined in claim 7 wherein said latch means includes a push button on the park brake lever.

11. The mower defined in claim 7 wherein said handlebar includes a shaft and said hand levers and said park brake lever are mounted for pivotal movement on said shaft.

12. In a power driven lawn mower having a pair of drivable wheels, and first and second pulley and belt drive systems for establishing drive to the wheels respectively, a transmission for transmitting drive from an engine to said systems, the improvement wherein each of said systems includes in combination a pulley belt and drive pulley, a first idler for releasably engaging said belt on one run thereof for establishing and disestablishing drive to the associated wheel, and a second idler pulley engagable and disengagable relative to an opposite run of the pulley belt for establishing and disestablishing drive to the associated wheel when said transmission is shifted into a reverse position to provide movement in reverse direction.

13. The combination defined in claim 12 further including a pair of hand levers for operating said first idler pulley and a third lever for operating said second idler pulley.

14. The combination defined in claim 13 wherein said hand levers are connected to brakes associated with said wheels to apply and release the brakes and wherein there is further included a park brake lever for simultaneously applying both brakes.

15. The combination defined in claim 12 further including shift means for shifting the transmission and means connected to said shift means for disconnecting drive from the engine to the transmission.

16. In a power driven lawn mower having a drivable wheel, and a pulley and belt drive system for establishing drive to the wheel and including a drive pulley, a belt trained about the drive pulley and an idler pulley for engaging and disengaging the belt and being mounted on an idler arm, said arm, being, movable to engage or disengage the idler pulley with the belt, the improvement comprising a brake system including a brake mounting bracket mounted on said arm to move with the arm while also being movable relative to the arm, a brake engageable with the wheel and means interconnecting said brake and said bracket for applying the brake to the wheel when the arm is moved to disengage the idler pulley from the belt.

17. The combination defined in claim 16 wherein said means connecting said bracket and said brake includes a rod mounted on said bracket and connected to said brake.

18. The combination defined in claim 17 further including means for adjusting the position of said rod on the bracket for adjusting the brake.

19. The combination defined in claim 18 wherein said means for adjusting the position of said rod includes a spring on the rod and means for adjusting the force of the spring.

20. The combination defined in claim 16 further including means for adjusting the position of the brake relative to said bracket.

21. The mower defined in claim 16 further including a second idler pulley engageable with the belt for driving the wheel in reverse.

22. In a power driven walk-behind lawn mower having a pair of drivable wheels, two drives including belts for establishing drive to said wheels respectively and two brakes for braking said wheels respectively, and a handlebar for operating the mower; the improvement comprising in combination a control system for operating the drives and brakes including two hand levers laterally spaced from each other and being pivotable towards and away from said handlebar for controlling the drives and brakes of the wheels respectively, a park brake lever located between said hand levers for simultaneously applying the brakes to both of said wheels, said park brake lever being pivotable between a first position for applying the brakes and a second position for releasing the brakes, a dead man control lever mounted for pivotable movement on one side of said handlebar towards and away from said handlebar, said drives each including a first idler for releasably engaging a pulley belt on one run thereof for establishing and disestablishing drive to the associated wheel for forward movement, and a second idler pulley engageable and disengageable relative to an opposite run of the pulley belt for establishing and disestablishing drive to the associated wheel for reverse movement.

23. The lawn mower defined in claim 22 wherein said first idler pulley is mounted on an arm, said brakes each include a bracket and a brake connected to the bracket, said bracket being mounted on said arm to be movable with the arm as well as relative to the arm.

24. The lawn mower defined in claim 23 further including a transmission connected to the drives, a shift means for operating the transmission, power means for driving the transmission, and means connected between the power means and the shift means for disengaging the transmission from the power means.

25. The lawn mower defined in claim 22 further including a transmission connected to the drives, a shift means for operating the transmission, power means for driving the transmission, and means connected between the power means and the shift means for disengaging the transmission from the power means.

26. In a power driven walk-behind lawn mower having a pair of drivable wheels, two drives for establishing drive to said wheels respectively and two brakes for braking said wheels respectively, the improvement comprising a control system for operating the drives and brakes comprising in combination, two hand levers laterally spaced from each other and being pivotable between two positions for controlling the drives and brakes of the wheels respectively, a park brake lever mounted relative to said mower for simultaneously applying the brakes to both of said wheels, and a dead man control lever mounted relative to said mower for deenergizing the mower upon release of the dead man control lever.

27. The mower defined in claim 26 including a generally horizontal handlebar, said hand levers and park brake lever being located on one side of the handlebar and said dead man lever control being located on the opposite side of the handlebar.

28. The mower defined in claim 27 wherein said hand levers are laterally spaced from each other and said park brake lever is located between said hand levers.

29. The mower defined in claim 28 wherein said park brake lever is engagable with said hand lever to apply braking through the hand levers.

30. In a power driven walk-behind lawn mower having a pair of drivable wheels, two drives for establishing drive to said wheels respectively and two brakes for braking said wheels respectively, and a handlebar extending generally transversely of the mower for operating the mower; the improvement comprising a control system for operating the drives and brakes comprising in combination, two hand levers laterally spaced from each other and being pivotable towards and away from said handlebar for controlling the drives and brakes of the wheels respectively, and a dead man control lever mounted for pivotable movement on one side of said handlebar towards and away from said handlebar, and wherein said hand levers are mounted on the opposite side of said handlebar.

31. The combination defined in claim 30 further including a park brake lever located between said hand levers for simultaneously applying the brakes to both of said wheels.

32. The combination defined in claim 31 wherein said park brake lever and said hand levers are pivotable about a common horizontal axis, said park brake lever being engageable with said hand levers.

33. In power driven lawn mower having a drivable wheel, and a pulley and belt drive system for establishing drive to the wheel respectively, the improvement wherein said system includes in combination a pulley belt and drive pulley, a first idler for releasably engaging said belt for establishing and disestablishing drive to the associated wheel, and a second idler pulley engagable and disengagable with respect to the belt for establishing and disestablishing drive to the associated wheel for driving the wheel in reverse to provide movement in reverse direction, and brake means for braking the wheel independently of said second idler pulley.

34. The combination defined in claim 33 wherein said brake means is associated with said first idler pulley such that the brake means is applied when the first idler pulley disestablishes drive to the pulley belt.

35. In a power driven lawn mower having a drivable wheel, and a pulley and belt drive system for establishing drive to the wheel and including a drive pulley, a belt trained about the drive pulley and an idler pulley for engaging and disengaging the belt and being mounted on an idler arm, said arm being movable to engage or disengage the idler pulley with the belt the improvement comprising a brake mounting bracket means connecting said bracket to the arm to move with the arm while also being movable relative to the arm, a brake engageable with the wheel and means interconnecting said brake and said bracket for applying the brake to the wheel when the arm is moved to disengage the idler pulley from the belt.

36. The combination defined in claim 35 further including a second idler pulley engageable with the belt for driving the wheel in reverse.

* * * * *